Nov. 21, 1961 F. R. POWELL 3,010,104
RADAR REFLECTIVE TOW TARGET
Filed Oct. 14, 1958 3 Sheets-Sheet 1
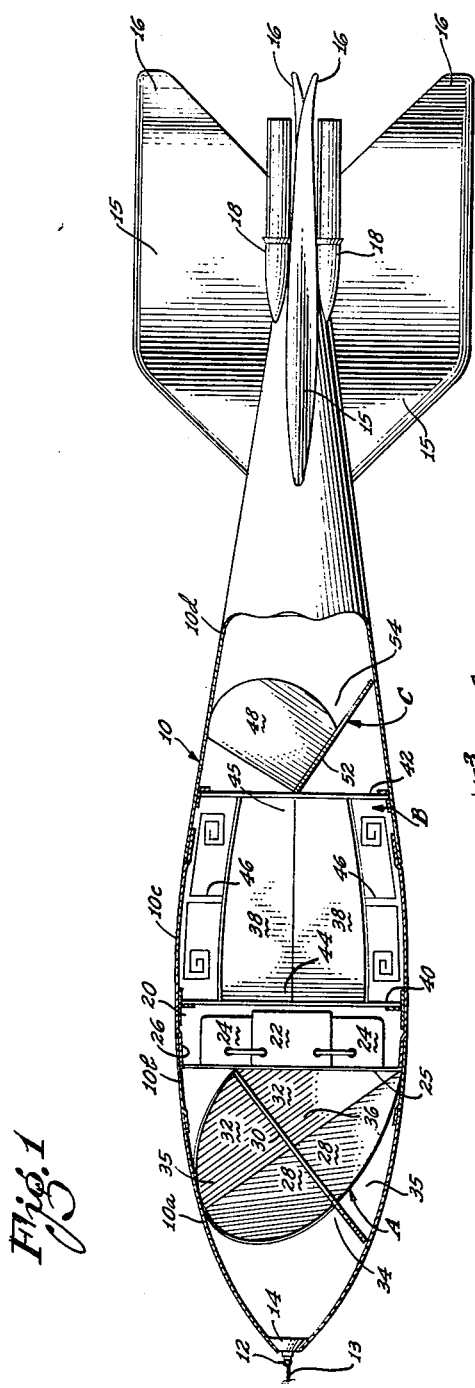
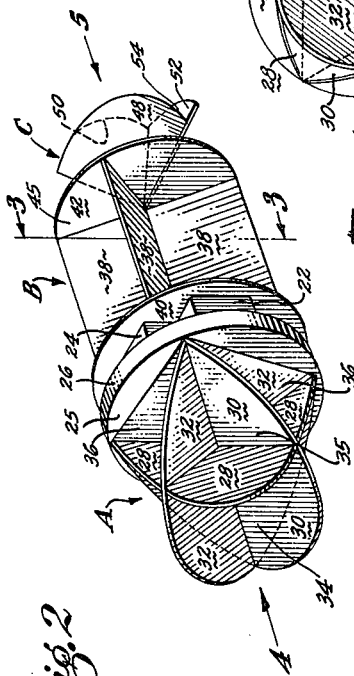
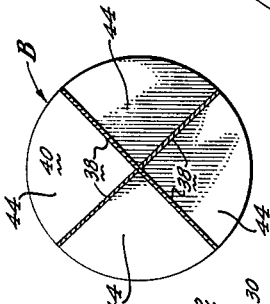
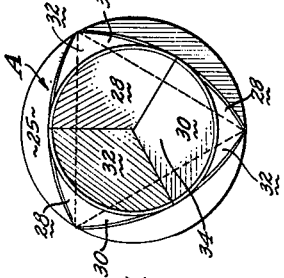
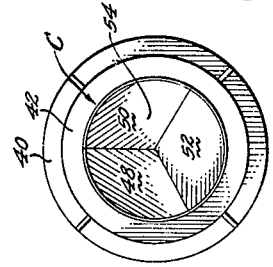
INVENTOR
Forbes R. Powell
By Smyth & Roston
Attorneys Nov. 21, 1961  F. R. POWELL  3,010,104
RADAR REFLECTIVE TOW TARGET
Filed Oct. 14, 1958  3 Sheets-Sheet 2

INVENTOR:
Forbes R. Powell
By Smyth & Roston
Attorneys

Nov. 21, 1961  F. R. POWELL  3,010,104
RADAR REFLECTIVE TOW TARGET
Filed Oct. 14, 1958  3 Sheets-Sheet 3

INVENTOR:
Forbes R. Powell
By Smyth & Roston
Attorneys

3,010,104
RADAR REFLECTIVE TOW TARGET
Forbes R. Powell, Playa Del Rey, Calif., assignor to Del Mar Engineering Laboratories, Los Angeles, Calif., a corporation of California
Filed Oct. 14, 1958, Ser. No. 767,160
8 Claims. (Cl. 343—18)

This invention relates to an aerial tow target to simulate the radar reflectivity of a military aerial target, such as an aircraft, for practice in tracking and intercepting such a military target. The invention relates particularly to a tow target of the type having a hollow bulbous streamlined body of revolution which is continuously rotated on its longitudinal axis in the course of flight.

A major problem to which the invention is directed is to achieve the type of radar reflectivity that characterizes and aircraft, such as a large bomber. The pattern of the power of the radar signals reflected back from a B-26 bomber is shown on page 76 of "Radar System Engineering" by Ridenour (McGraw-Hill) and is characterized by relatively narrow peaks extending around the azimuth, the peaks being so closely spaced as to be equivalent, in effect, to substantially uniform strength of the reflected signals in all directions. The numerous relatively narrow high amplitude peaks are caused by constructive and destructive interference of waves reflected from different surfaces. The destructive interference results in cancellation and the constructive interference results in the peaks.

A second problem to which the invention is directed is to provide the desired radar reflection pattern and at the same time to provide storage space in the tow target for various kinds of tow target equipment. The equipment may include such items as radio components, a power supply, and means for firing flares at the trailing end of the tow target. Such equipment is heavy in comparison with the weight of the tow target body so that careful consideration must be given to the location of the equipment to avoid intolerable shift in the location of the center of gravity of the loaded tow target.

With reference to the first problem, the range at which a radar reflective target may be detected by a given radar detector system in a given direction from the tow target depends on the radar cross section, i.e., the radar reflective area that can be "seen" from the detector, and varies with the fourth root of the radar cross section. The radar cross section varies with the aperture area. In other words large corner reflectors are required for detection of the tow target at substantial distances and the problem is to get corner reflectors of the largest possible aperture area facing in all directions and occupying a minimum volume of the general configuration of a tow target. The pattern of radar reflectivity may be represented by plotting the fourth root of the radar cross section of the tow target for the different directions over a range of 360°. This first problem is met if such a diagram reveals that the tow target effectively reflects radar signals around the whole azimuth with no significant null zones.

The present invention meets this first problem by a combination of a forward radar reflector assembly, a rearward radar reflector assembly and an intermediate radar reflector assembly.

The forward and rearward reflector assemblies of the rotary tow target form forwardly and rearwardly facing corner reflectors, respectively, that produce corresponding forward and rearward lobes of substantial angular dimension on the plotted diagram. The intermediate assembly comprises longitudinal radial reflector surfaces 90° apart in combination with transverse surfaces at the opposite ends thereof at 90° thereto. These longitudinal and transverse surfaces form two circumferential series of corner reflectors, the corner reflectors of one series having their axes of symmetry inclined forward approximately 45° from the longitudinal axis of the tow target, the corner reflectors of the other series having their axes of symmetry inclined approximately 45° rearward. Each corner reflector has three plane surfaces at 90° from each other intersecting at a common point and the axis of symmetry is a line through the intersection point at the same angle to all three surfaces, the angle being 45°. These two series of inclined corner reflectors produce four diagonal lobes when the tow target rotates on its axis, each of the four lobes being of substantial angular dimension and being of a radial dimension comparable to the radial dimensions of the previously mentioned forward and rearward lobes.

The longitudinal reflector surfaces of the intermediate assembly also produce high amplitude opposite lateral lobes perpendicular to the tow target axis and while these opposite lateral lobes are much narrower than the forward, rearward and intermediate lobes, they do complete an azimuth pattern that may be adequate for some tow target exercises. The preferred practice of the invention, however, includes additional corner reflectors to produce opposite lateral lobes of substantial angular magnitude to fill out the azimuth pattern and to approach more closely the reflectivity behavior of a large bomber.

These additional corner reflectors may be incorporated in either the forward reflector assembly or in the rearward reflector assembly, and may comprise two circumferential series of corner reflectors. The axes of symmetry of the corner reflectors of one of these additional series are inclined forward at substantially less than 45° from a plane perpendicular to the axis of the tow target body and the axes of symmetry of the other series of corner reflectors are inclined rearward at substantially less than 45° from the perpendicular plane. With this arrangement, the angular ranges of reflection of the two series overlap to produce the desired relatively broad lateral lobes of the diagram.

The described arrangement of radar reflecting surfaces takes full advantage of the rotation of the tow target to produce a spherical pattern of reflection that sufficiently approaches uniformity in all directions to serve the purpose of the invention. The spherical pattern is a pulsating pattern by reason of the rotation of the tow target and, therefore, the lobes of the diagram represent average values. The frequency of the pulsations is high enough to keep the radar guidance system of a missile "locked" on the tow target, any null periods or low periods of energy of radar reflection being so momentary as to be insignificant.

With reference to null or low energy regions in the pattern of radar reflectivity, it is to be noted that where the lobes of the pattern overlap in the low energy regions, the overlapping reflected signals interfere to add and cancel and the additive signals produce narrow relatively high amplitude peaks.

The second problem of providing space in a tow target body for the tow target equipment must take into consideration not only the effect of the equipment on the center of gravity of the loaded tow target, but must also take into consideration the necessity for avoiding undue masking of the radar reflecting surfaces by the equipment.

An important feature of the invention is that the described arrangement of three reflector assemblies makes it possible to provide a completely satisfactory equipment compartment simply by separating either the forward assembly or the rearward assembly from the intermediate assembly. In the presently preferred practice of the invention, the equipment compartment is between the intermediate assembly and the forward assembly. In this regard, a further feature of the invention is that both of the forward and rearward reflector assemblies provide additional space for relatively small pieces of equipment, if such additional space is required. As will be apparent, when the equipment is located on the tow target in this manner, it does not mask any of the essential radar reflector surfaces.

The various features and advantages of the invention may be understood by reference to the following detailed description in conjunction with the accompanying drawings.

In the drawings, which are to be regarded as merely illustrative:

FIGURE 1 is a view partly in side elevation and partly in section, showing a tow target incorporating a selected practice of the invention;

FIGURE 2 is a perspective view of the radar reflector structure that is enclosed in the body of the tow target shown in FIGURE 1;

FIGURE 3 is a transverse section taken as indicated by the line 3—3 of FIGURE 2 to show the construction of the intermediate radar reflector assembly;

FIGURE 4 is an end elevation of the reflector structure viewed as indicated by the arrow 4 in FIGURE 2;

FIGURE 5 is an elevation of the reflector structure viewed from the opposite end as indicated by the arrow 5 of FIGURE 2;

Figure 6:
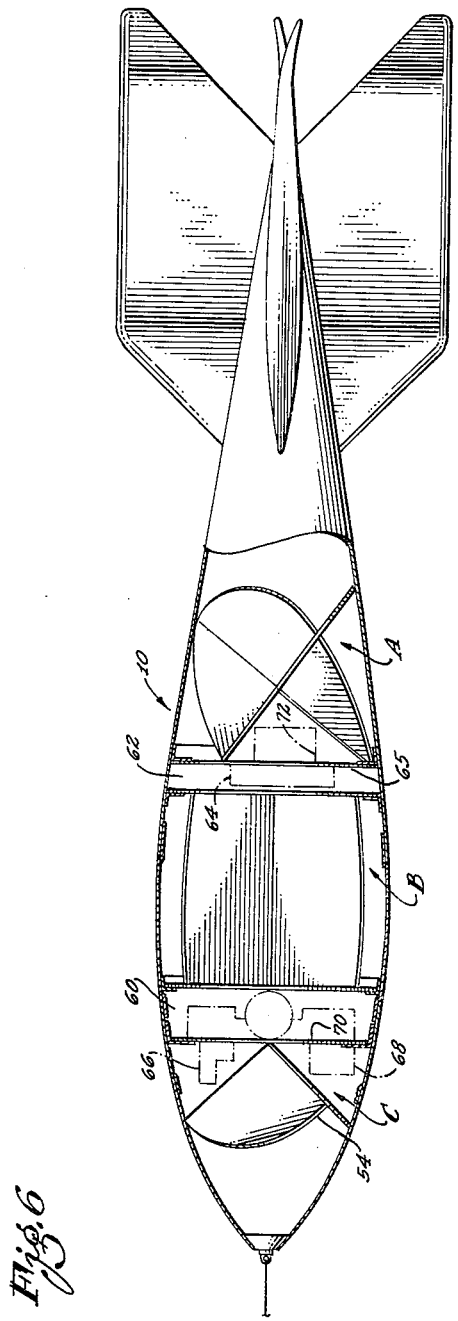
FIGURE 6 is a view partly in side elevation and partly in section showing a second tow target incorporating a second practice of the invention.

FIG. 1, illustrating the first embodiment of the invention, shows a tow target having a bulbous streamlined body of revolution, generally designated 10, that is connected by a swivel fitting 12 to a tow cable 13, the purpose of the swivel fitting being to permit the tow target to rotate on its longitudinal axis without twisting the cable. In the construction shown, the swivel fitting 12 is connected to a conical lead body 14 in the nose of the tow target, which lead body is a counterweight to insure that the center of gravity of the tow target is located sufficiently forward.

The tow target body 10 is equipped with four stabilizing tail fins 15 which have angled or bent tips 16 which react to the air stream and serve as aerodynamic means to cause the tow target to rotate about its longitudinal axis as it is drawn through the air. In a typical flight below sonic speeds, the tow target may rotate, for example, at a rate of 100 to 300 r.p.m. This particular tow target is adapted to carry flares at its trailing end to be ignited under remote control. For this purpose, the body 10 is provided with a series of four streamlined casings to receive flares, each casing being mounted between a pair of stabilizing fins 15.

The tow target body 10 is hollow and may be of any suitable construction. In this instance, the body comprises a series of thin-walled sections, each of which is made of paper pulp molded under heat and pressure. The molded paper sections are impregnated with a suitable waterproofing agent which not only makes the body material waterproof, but also provides the tow target with a smooth exterior surface.

In the construction shown, the body 10 comprises a molded nose section 10a, two central sections 10b and 10c, and a tail section 10d. These sections are interconnected by overlapping joints, as shown, with the outer surface of the tow target smooth at each joint.

The structure for reflecting radar signals comprises a forward radar reflector assembly, generally designated A, an intermediate radar reflector assembly, generally designated B, and a rearward radar reflector assembly, generally designated C. The required space for the tow target equipment that must be carried by the body 10 is provided by spacing the forward assembly A and the intermediate assembly B a suitable distance apart to form an equipment compartment 20. In this instance, the equipment includes a power pack 22 and two sections of a radio receiver 24. This equipment is mounted on a sheet metal bulkhead 25 which forms the forward wall of the equipment compartment 20 and which is formed with a circumferential flange 26 to reinforce the body shell.

The forward radar reflector assembly A may comprise three panels 28, 30 and 32, which are in planes that intersect at 90° from each other and intersect at a point that is located substantially on the longitudinal axis of the tow target body. To permit the three panels to intersect in the required manner, the panels are cut into sections that meet along lines of intersection of the planes and some of the sections may be slotted to straddle other sections along lines of intersection of the planes.

The three panels 28, 30 and 32 may be made of any suitable material to provide metal reflecting surfaces on the opposite faces of the panels. In the present construction, the panels comprise plates of foamed plastic, such as foamed cellulose acetate or foamed polystyrene, each plate having a layer of metal foil, such as aluminum foil, bonded to its opposite faces. The three intersecting panels 28, 30 and 32 are cut to generally elliptical configuration to meet with the surrounding body shell of the tow target and are bonded to the body shell so that the shell reinforces the reflector panels, and the reflector panels in turn reinforce the shell.

The three panels 28, 30 and 32 form a forwardly directed corner reflector, generally designated 34, at the front end of the tow target this corner reflector having the usual configuration in which three reflecting surfaces at 90° from each other meet at a common point. The axis of symmetry of this forward corner reflector substantially coincides with the longitudinal axis of the tow target.

In the construction shown, the three reflector panels 28, 30 and 32 extend rearward of their common point of intersection on the axis of the tow target and are backed at their rearward edges against the previously mentioned sheet metal bulkhead 25. The extension of the three panels 28, 30 and 32 rearward from their point of common intersection results in the formation of six additional corner reflectors comprising a first circumferential series of three corner reflectors 35 having their axes of symmetry inclined at less than 45° forward from a plane perpendicular to the axis of the tow target, and a second circumferential series of three corner reflectors 36 having their axes of symmetry inclined at less than 45° in the opposite rearward direction from the perpendicular plane.

FIGURE 1 shows how the panels 28, 30 and 32 form two of the forwardly inclined corner reflectors 35 and one of the rearwardly inclined reflectors 36. FIG. 2 shows in perspective how the three panels form one of the forwardly inclined corner reflectors 35 and two of the rearwardly inclined corner reflectors 36. It is apparent from an inspection of these two figures that the two circumferential series of corner reflectors 35 and 36 are staggered with the forwardly inclined corner reflectors alternating with the rearwardly inclined corner reflectors.

The intermediate reflector assembly B may comprise four longitudinal panels 38 in combination with two transverse panels 40 and 42 at the opposite ends thereof. These panels may be of the previously described construction comprising plates of foamed plastic with foil bonded to the opposite surfaces of the plates. The longitudinal panels 38 meet along the longitudinal axis of the tow target and are positioned at 90° angles from each other. The longitudinal panels 38 meet the forward transverse panel 40 to form an circumferential series of four corner reflectors 44 that have their axes of symmetry inclined rearwardly at angles of approximately 45° from the longitudinal axis of the tow target body. In like manner, the four longitudinal panels 38 meet the rearward transverse panel 42 to form therewith a circumferential series of four corner reflectors 45 having their axes of symmetry inclined forwardly at approximately 45° from the longitudinal axis of the tow target body. The length of the four longitudinal panels should be at least approximately twice their width or radial dimension to prevent partial masking of the two sets of corner reflectors 44 and 45.

FIG. 1 shows how a pair of dipole antennas for the radio receiver 24 may be mounted in the region of the intermediate radar reflector assembly B. Each dipole antenna 46 comprises two wires bent to the configuration shown, and extending into the longitudinal space formed by a pair of the longitudinal panels 38. These antenna wires being very small in relation to the wave length of the radar will have little or no effect on the radar reflectivity. Antennas can also be placed in the nose or tail if required.

The rearward radar reflector assembly C comprises three foil-covered foamed plastic panels 48, 50 and 52 positioned at 90° from each other and meeting at a common point on the longitudinal axis of the tow target, this point being adjacent the rearward panel 42 of the intermediate radar reflector assembly B. This arrangement forms a rearwardly directed corner reflector 54 having its axis of symmetry substantially coinciding with the longitudinal axis of the tow target body. Here again the outer edges of the three panels 48, 50 and 52 are of generally elliptical configuration to meet the body shell of the tow target, the three panels being bonded to the body shell to reinforce the body shell and to be reinforced by the body shell. Thus the rearward corner reflector 54 is of circular configuration when viewed along the axis of the tow target, as may be seen in FIG. 5, just as the corner reflector 34 at the forward corner reflector 34 is circular in configuration when viewed along the axis of the tow target, as may be seen in FIG. 4.

Figure 8:
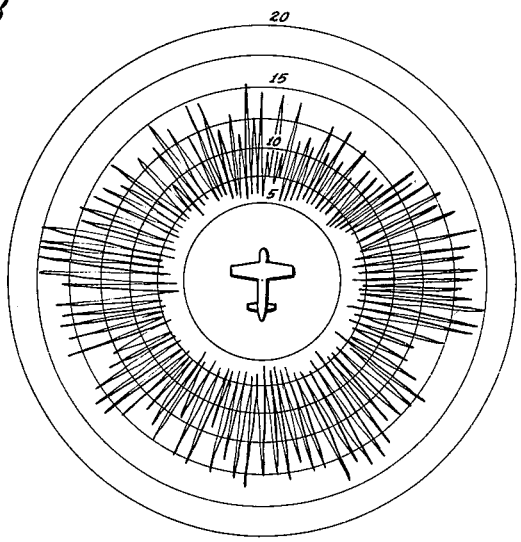
FIGURE 8 is a diagram that approximates the pattern of the power of radar signals reflected to their sources from a B-26 bomber.
Figure 9:
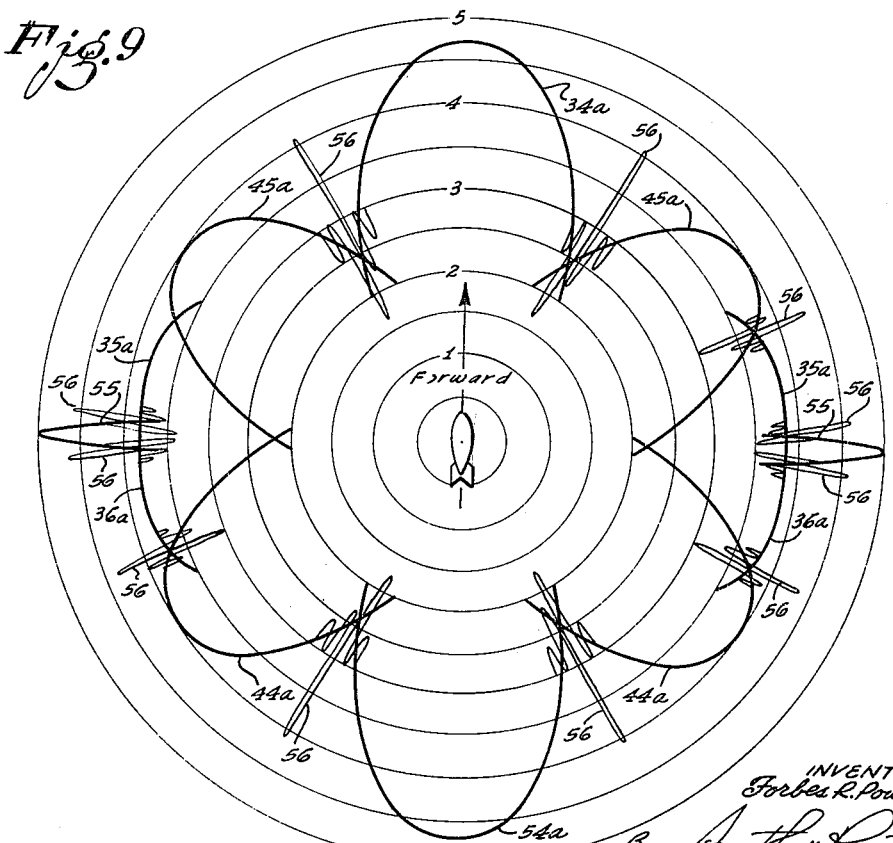
FIGURE 9 is a diagram representing the pattern of radar reflection of the tow target of the present invention, the diagram comprising the fourth root of the radar cross section of the tow target plotted for the different directions of viewing over a range of 360°.

FIG. 8 is a circular graph showing the strength of the radar signals reflected back from a B-26 bomber. It is apparent that the strength of the reflected signals is substantial in all directions of the azimuth. FIG. 9 shows how the pattern of reflection of radar signals back to their sources produced by the described tow target also provides reflected signals of adequate strength over a range of 360°.

In the general radar equation, the range of detection appears as a fourth power while the radar cross section appears as a first power. Thus the actual range of detection is proportional to the fourth root of the radar cross section. In FIG. 9, the fourth root of the radar cross section is plotted for the different directions of viewing the tow target. The curves in FIG. 9 are calculated estimates based on both theoretical analysis and actual test data. It is necessary to show average values because the target is rotated. The average values shown in FIG. 9 are conservative since the peak values almost always are at least twice the average values.

In FIG. 9, the forward lobe 34a of the radar reflection pattern is produced by the forward corner reflector 34 of the forward radar reflector assembly A. In like manner, the rearward lobe 54a is produced by the corner reflector 54 which is provided at the rear end of the tow target. The two diagonally forward lobes 45a in FIG. 9 are produced by the circumferential series of four corner reflectors 45 of the intermediate radar reflector assembly B. In like manner, the two rearwardly inclined lobes 44a in FIG. 9 are produced by the circumferential series of four corner reflectors 44 of the intermediate radar reflector assembly B. In addition, FIG. 9 shows two opposite lateral lobes 55 that are relatively narrow but of relatively high amplitude. These lateral lobes are produced not by corner reflectors, but by convergent pairs of the longitudinal panels 38 of the intermediate radar reflector assembly B.

It is apparent from FIG. 9 that the six lobes comprising the end lobes 34a and 54a, the pair of diagonal lobes 44a and the pair of diagonal lobes 45a are uniformly distributed around the azimuth and overlap sufficiently at the bases of the lobes to avoid null points. It may be readily appreciated that the six lobes make the tow target capable of detection in all directions of the azimuth. Since the tow target is rotating, the azimuth pattern shown in FIG. 9 is a section of a pattern that is actually spherical so that the tow target may be detected equally well from above and from below.

With the six lobes supplemented by the two high amplitude narrow lateral lobes 55, the pattern of radar reflection as described to this point is satisfactory for some purposes. In the preferred practice of the invention, however, the reflection pattern is augmented by the two circumferential series of corner reflectors 35 and 36 of the forward radar reflector assembly A. Since the axes of symmetry of these two series of corner reflectors are inclined only slightly in opposite directions from a plane perpendicular to the axis of the tow target, the reflection patterns of the two series overlap to make relatively broad lateral lobes in FIG. 9. Each of these lobes has a forward portion 35a which is primarily the result of the three corner reflectors 35 and a rearward portion 36a which is primarily the result of the three corner reflectors 36. With these additional relatively broad lateral lobes, the complete reflection pattern shown in FIG. 9 is equivalent to the reflection pattern shown in FIG. 8 with respect to the capability of the tow target for detection by radar systems that are designed to track aerial objects and are designed to guide missiles automatically for interception of aerial objects.

In FIG. 9 the constructive and destructive interference of the signals in the low energy regions where the lobes overlap result in additional narrow signal peaks 56 which to a useful degree improve the low energy regions and which also simulate the reflectivity of an aircraft.

FIG. 6, illustrating the second embodiment of the invention, exemplifies the fact that the radar reflecting structure of the first described embodiment may be reversed end for end in the tow target body 10. Thus in FIG. 6, the radar reflector assembly A is in the tail section of the tow target rearward from the intermediate radar reflector assembly B and the third radar reflector assembly C is in the nose section of the body. It is obvious that the second embodiment of the invention will produce the same pattern of reflectivity shown in FIG. 9.

FIG. 6 further illustrates the fact that a compartment for the tow target equipment may be provided at either end of the intermediate radar reflector assembly B. FIG. 6 shows a forward equipment compartment 60 which corresponds to the equipment compartment 20 of the first embodiment of the invention. FIG. 6 also shows a rearward equipment compartment 62, the forward wall of which is formed by the intermediate radar reflector assembly B and the rear wall of which is a bulkhead 65. In FIG. 6, the broken line rectangle 64 represents equipment in the compartment 62. The three panels of the radar reflector assembly A back against the bulkhead 65.

FIG. 6 further illustrates the fact that both the radar reflector assembly A and the radar reflector assembly C provide additional dead space which may be occupied by equipment. Equipment indicated in broken lines at 66 and 68 is shown mounted on a bulkhead 70 to occupy space in the region of the corner reflector 54, and equipment indicated by the broken lines 72 is mounted on the bulkhead 65 in the region of the radar reflector assembly A.

Figure 7:
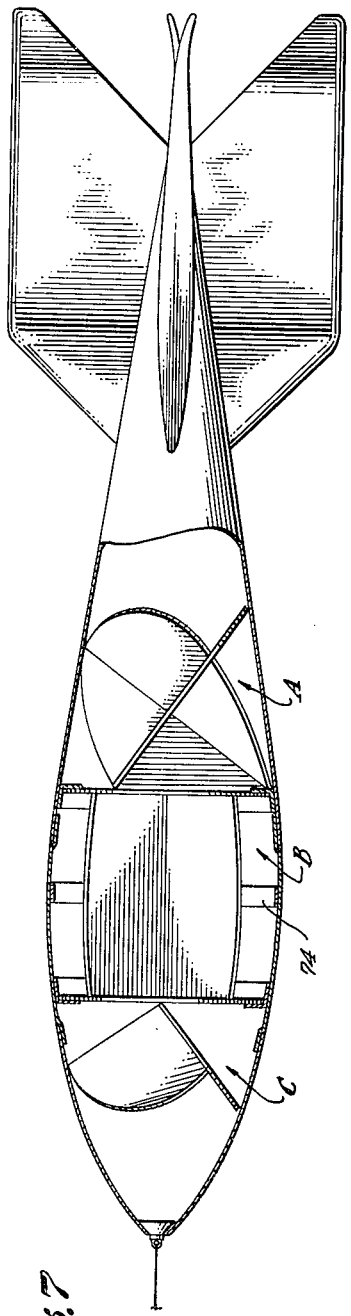
FIGURE 7 is a similar view of a tow target incorporating a third practice of the invention.

In some instances, a radar-reflective tow target carries no equipment whatsoever. In such instances, the radar reflector structure shown in FIG. 7 may be employed. In FIG. 7, the three radar reflector assemblies A, B and C are in the same reversed order as in FIG. 6. The bulkhead 65 of FIG. 6 is omitted since the radar reflector assembly A backs against the radar reflector assembly B and the bulkhead 70 of FIG. 6 is omitted since the radar reflector assembly C also backs directly against the radar reflector assembly B. The structure shown in FIG. 7 includes an internal reinforcing band 74 for the body shell, this reinforcing band being made of plastic material or other material that is substantially transparent to radar signals.

My description in specific detail of the selected embodiments of the invention will suggest to those skilled in the art various changes, substitutions and other departures from my disclosure within the spirit and scope of the appended claims.

I claim:

1. In a rotary tow target having a hollow bulbous streamlined aerodynamic body, means for effectively reflecting radar signals back to sources in substantially all directions radiating from the tow target, comprising: a forward end radar corner reflector assembly inside said body; a rearward end radar corner reflector assembly inside said body; and an intermediate radar corner reflector assembly inside said body, said forward end assembly providing a forwardly directed corner reflector with its axis of symmetry substantially coaxial of the tow target and said rearward end assembly providing a rearwardly directed corner reflector with its axis of symmetry substantially coaxial of the tow target for reflecting radar signals towards their sources in forward and rearward ranges of directions, said intermediate reflector assembly having four reflecting surfaces 90° apart extending longitudinally of said body and transverse reflector surfaces at the opposite ends of said longitudinally extending surfaces forming a first circumferential series of corner reflectors having their axes of symmetry inclined forward at angles to the longitudinal axis of the tow target body and a second circumferential series of corner reflectors having their axes of symmetry inclined rearward at angles to the longitudinal axis of the tow target body for reflecting radar signals back to their sources in corresponding ranges of directions inclined from the axis of the tow target body.

2. A combination as set forth in claim 1 in which at least one of said end assemblies is spaced from said intermediate assembly to provide space for tow target equipment without such equipment interfering with the desired reflection of radar signals.

3. A combination as set forth in claim 1 in which said tow target body comprises a thin-walled shell and in which said forward and rearward corner reflectors have generally elliptical edges joined to said shell whereby the forward and rearward reflectors are circular in face view and extend over the full cross-sectional area of the tow target.

4. In a rotary tow target having a hollow bulbous streamlined aerodynamic body, means for effectively reflecting radar signals back to sources in substantially all directions radiating from the tow target, comprising: a forward end radar corner reflector assembly inside said body; a rearward end radar corner reflector assembly inside said body; and an intermediate radar corner reflector assembly inside said body, said forward end assembly providing a forwardly directed corner reflector and said rearward end assembly providing a rearwardly directed corner reflector for reflecting radar signals towards their sources in forward and rearward ranges of directions, said intermediate reflector assembly having four reflecting surfaces 90° apart extending longitudinally of said body and transverse reflector surfaces at the opposite ends of said longitudinally extending surfaces forming a first circumferential series of corner reflectors having their axes of symmetry inclined forward at angles to the longitudinal axis of the tow target body and a second circumferential series of corner reflectors having their axes of symmetry inclined rearward at angles to the longitudinal axis of the tow target body for reflecting radar signals back to their sources in corresponding ranges of directions inclined from the axis of the tow target body, at least one of said end assemblies including a third circumferential series of corner reflectors having their axes of symmetry inclined forward at substantially less than 45° from a plane perpendicular to the axis of the tow target body, at least one of said end assemblies including a fourth circumferential series of corner reflectors having their axes of symmetry inclined rearward substantially less than 45° from a plane perpendicular to the axis of the tow target body, whereby said third and fourth series of corner reflectors cooperate to reflect signals back to their sources in a range of directions with said perpendicular plane included in the range.

5. A combination as set forth claim 4 in which both said third and fourth circumferential series of corner reflectors are included in one of said end assemblies.

6. In a rotary tow target having a hollow bulbous streamlined aerodynamic body, means for effectively reflecting radar signals back to sources in substantially all directions radiating from the tow target, comprising: a forward end radar corner reflector assembly inside said body; a rearward end radar corner reflector assembly inside said body; and an intermediate radar corner reflector assembly inside said body, said forward end assembly providing a forwardly directed corner reflector and said rearward end assembly providing a rearwardly directed corner reflector for reflecting radar signals towards their sources in forward and rearward ranges of directions, said intermediate reflector assembly having four reflecting surfaces 90° apart extending longitudinally of said body and transverse reflector surfaces at the opposite ends of said longitudinaly extending surfaces forming a first circumferential series of corner reflectors having their axes of symmetry inclined forward at angles to the longitudinal axis of the tow target body and a second circumferential series of corner reflectors having their axes of symmetry inclined rearward at angles to the longitudinal axis of the tow target body for reflecting radar signals back to their sources in corresponding ranges of directions inclined from the axis of the tow target body, one of said end assemblies comprising reflector panels in three intersecting planes at 90° from each other, said planes intersecting at a point substantially on the longitudinal axis of the tow target body, said panels extending both forwardly and rearwardly from said point to form not only the corresponding end corner reflector but also to form a circumferential series of six corner reflectors, said series of six comprising a first set of three corner reflectors having their axes of symmetry inclined at substantially less than 45° forward from a plane perpendicular to the axis of the tow target body and a second set of three corner reflectors having their axes of symmetry inclined substantially less than 45° rearward from a plane perpendicular to the axis of the tow target body, said two sets being staggered relative to each other.

7. In a rotary tow target having a hollow bulbous streamlined aerodynamic body, means for effectively reflecting radar signals back to sources in substantially all directions radially of the tow target, comprising: a forward set of reflector panels in three planes intersecting at 90° from each other to form a forwardly directed corner reflector having its axis of symmetry substantially coaxial of the tow target; a rearward set of reflector panels in three planes 90° from each other intersecting at a point to form a rearward directed corner reflector having its axis of symmetry substantially coaxial of the tow target; a set of four longitudinal reflector panels intermediate said forward and rearward sets and extending radially from the axis of the tow target at 90° from each other; two transverse reflector panels at the opposite ends of the said longitudinal panels and forming therewith a first circumferential series of corner reflectors and a second circumferential series of corner reflectors, the axes of symmetry of the corner reflectors of said first series being inclined forward from the axis of the tow target, and the axes of symmetry of the corner reflectors of said second series being inclined rearward from the axis of the tow target, one of said forward and rearward sets of panels forming a third circumferential series of corner reflectors having their axes of symmetry inclined at substantially less than 45° forward from a plane perpendicular to the longitudinal axis of the tow target, and a fourth circumferential series of corner reflectors having their axes of symmetry inclined at substantially less than 45° rearward from a plane perpendicular to the longitudinal axis of the tow target.

8. A combination as set forth in claim 3 in which at least one of said end assemblies is spaced from said intermediate assembly to provide space for equipment.

References Cited in the file of this patent

UNITED STATES PATENTS

| | | |
|---|---|---|
| 2,805,065 | Cotton | Sept. 3, 1957 |
| 2,821,396 | Seeley | Jan. 28, 1958 |
| 2,869,120 | LoLmaugh | Jan. 13, 1959 |
| 2,898,588 | Graham | Aug. 4, 1959 |

OTHER REFERENCES

Aviation Week, "Airstream Reels Out Target 5-mi." December 3, 1956, p. 113.